No. 757,835. PATENTED APR. 19, 1904.
R. PATTERSON.
EYE EXTRACTOR FOR FRUITS OR VEGETABLES.
APPLICATION FILED JAN. 6, 1904.
NO MODEL.
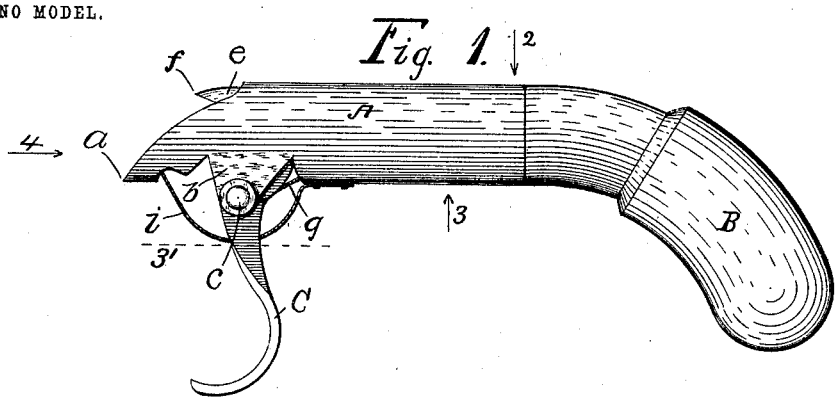
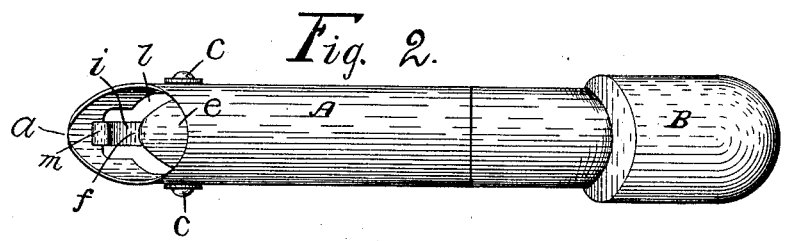
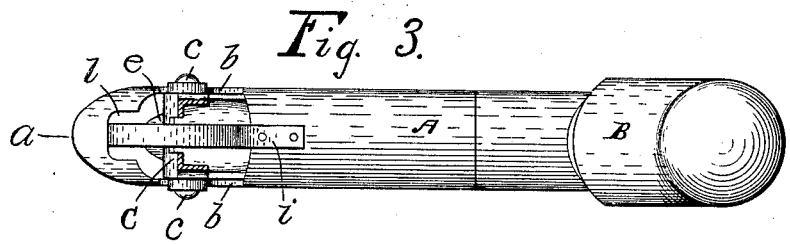
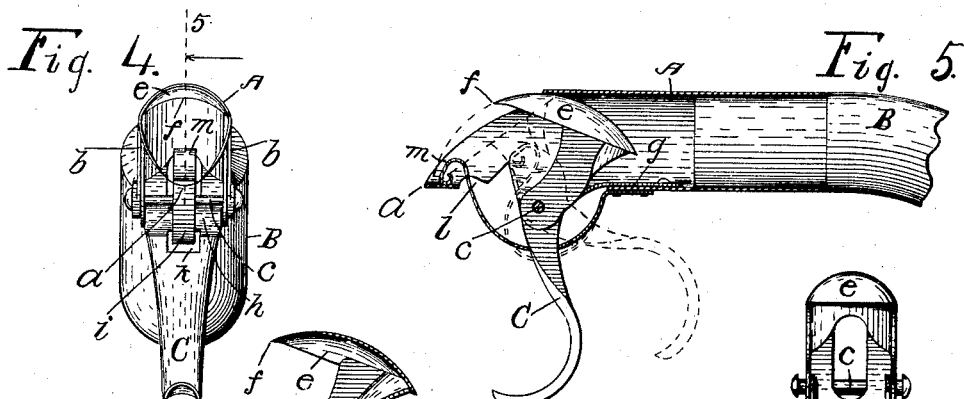
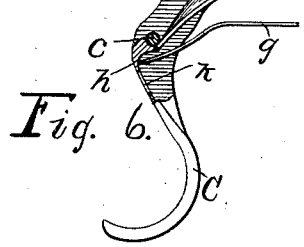
Attest:
M. B. Smith.
E. C. Wiscown.
Inventor:
Robert Patterson,
By E. B. Whitmore, Atty.
THE NORRIS PETERS CO., PHOTO-LITHO., WASHINGTON, D. C.

No. 757,835.  Patented April 19, 1904.

UNITED STATES PATENT OFFICE.

ROBERT PATTERSON, OF ROCHESTER, NEW YORK, ASSIGNOR OF ONE-HALF TO JAMES L. WHALEN, OF ROCHESTER, NEW YORK.

EYE-EXTRACTOR FOR FRUITS OR VEGETABLES.

SPECIFICATION forming part of Letters Patent No. 757,835, dated April 19, 1904.

Application filed January 6, 1904. Serial No. 187,919. (No model.)

*To all whom it may concern:*

Be it known that I, ROBERT PATTERSON, of Rochester, in the county of Monroe and State of New York, have invented a new and useful Improvement in Eye-Extractors for Fruits or Vegetables, which improvement is fully set forth in the following specification and shown in the accompanying drawings.

My invention is a device to be held in the hand for quickly and conveniently removing the eyes or calyxes of fruits and vegetables—such as pineapples, certain varieties of potatoes, &c.—and for conveniently removing the stems and the calyxes of apples, pears, and other fruits and the cores of such fruits after the bodies have been centrally divided either longitudinally or transversely.

The eyes of pineapples and some vegetables and the stems and calyxes of various fruits are commonly deeply sunk into the bodies and are removed with difficulty when an ordinary knife is used, the operation of digging away the sides of the cavities with such means being slow and tedious and also necessarily wasteful.

Instruments have been devised for removing the eyes of pineapples by means of a shear cut; but this is found in practice not to be satisfactory, as in removing the eyes by this manner of cut much of the good and valuable meat of the apple is necessarily cut away and wasted. Besides, the resistance of the substance of the fruit to the shear is frequently great and tends to bring a severe and injurious strain upon the thumb and fingers of the hand. In considering these facts and the necessities of the case I have aimed to produce a device for plucking out the eyes and clearing the similar cavities of pineapples and other like bodies by means of thrust or gouge cuts, the two cutters or parts of the instrument moving successively and independently endwise into the body and without shearing or the cutting edges passing each other or in any way coacting. This manner of cutting into the fruit plucks out the eye or clears the cavity with the least waste of material possible, and the strain upon the hand in operating the device is thereby reduced to a minimum.

The construction of the instrument and the manner of its use, together with the objects and the advantages of the same, are hereinafter fully described, and particularly pointed out in the appended claims, reference being had to the accompanying drawings, forming a part of this specification.

Figure 1 is a side elevation of my new eye-extractor ready for use. Fig. 2 is a plan seen as indicated by arrow 2 in Fig. 1. Fig. 3 is a view from beneath indicated by arrow 3 in Fig. 1, the trigger being horizontally sectioned on the dotted line 3' in said figure. Fig. 4 is a front end view seen as indicated by arrow 4 in Fig. 1. Fig. 5 is a side elevation of the device, the barrel and the springs being centrally and longitudinally sectioned on the dotted line 5 5 in Fig. 4, a part of the handle being broken away and parts shown in two positions by full and dotted lines. Fig. 6 is a side elevation of the trigger and inner cutter and the actuating-spring detached. Fig. 7 is a rear view of the trigger and attached cutter seen as indicated by arrow in Fig. 5.

A in the drawings is a hollow metal cylindrical barrel secured to a suitable bent handle B, preferably of wood, the manner of connecting the handle with the barrel being shown in Fig. 5. The forward end of the barrel is open and slanted, as shown, the extreme advance point *a* being brought to a cutting edge for piercing the fruit at the side of the eye or cavity. The lower side of the barrel is cut away and formed with an opening *l* near its forward end and further formed with parallel pendent hangers or ears *b b*, as shown. A trigger-lever or trigger C is hung between the ears *b b* on a transverse pin *c*, piercing the ears, the lever occupying the opening *l* and being partly without and partly within the barrel and adapted to swing in a vertical plane on the pivot-pin *c*. At the upper end of the trigger is secured a hollow inner cutter *e*, having its forward end *f* reduced to a cutting edge, this cutter being always within the barrel and moving inside thereof toward or from the open end when the trigger is turned on its axis. When the handle B is held naturally in the hand, the trigger will be in convenient reach of the forefinger of the hand, and by pulling backward against the trigger it, with the cutter $e$, will be brought to the position shown by dotted lines in Fig. 5. In this position of the inner cutter its sharp edge $f$ meets and abuts squarely against the inner concave surface of the barrel A, these forward movements of the inner cutter being endwise and serving to deliver truly thrust or gouge cuts against the fruit. The trigger and the cutter $e$ are held in normal positions (shown by full lines) by means of a simple spring $g$, seated longitudinally in the barrel A and having its forward end pressing against a part $h$ of the trigger just beneath the axial pin $c$.

In using the device for removing the eyes of pineapples or for excavating or clearing similar cavities in fruits, &c., the barrel A is first pushed endwise into the body of the fruit at one side of the eye or cavity, the sharp edge $a$ serving to partly separate the part to be removed from the surrounding substance of the fruit. The trigger C is then pulled by the finger backward, carrying the inner cutter forward into the fruit with a thrust movement at the other side of the eye or cavity, completing the separation of the part to be removed from the body of the fruit. The excavator now being withdrawn, the finger still holding the trigger back, the separated part or substance will be brought away by the hollow cutter, leaving the cavity clean. These forward movements of the inner cutter $e$ into the fruit are made with small resistance from the substance of the fruit and with easy pulls of the finger against the trigger C, and these movements of the inner cutter are made without any coaction with the cutting edge $a$ of the barrel, the inner cutter acting subsequently to and independently of the action of said cutting edge $a$, the two cutting edges $f$ and $a$ not meeting or passing each other. With this excavator I also provide an ejector for throwing out the detached mass from the barrel when released or set at liberty by releasing the trigger. This ejector consists of a longitudinally-disposed spring $i$, preferably of flat steel, secured at its rear end to the under side of the barrel A. This spring bends downward through an opening $k$, Fig. 4, in the trigger, thence upward through the opening $l$ in the barrel to the interior thereof, having its forward curled end or head $m$ resting against the inner surface of the barrel near the cutting edge $a$. When the barrel is primarily forced into the fruit, as stated, the part of the latter entering the barrel will encounter the head $m$ of the spring and push it back to the position shown by dotted lines in Fig. 5. The inner cutter being advanced into the fruit and the instrument withdrawn, as stated, the rejected part or mass of the fruit in the barrel will be thrown out by the spring as soon as it is released by the inner cutter. The edge $f$ of the inner cutter is given such a curve that it will when in its forward position meet the inner concave surface of the barrel in a continuous line of contact, so as to completely sever the mass within the barrel.

What I claim as my invention, and desire to secure by Letters Patent, is—

1. An eye-extractor for fruits and vegetables, comprising a barrel open at its forward end and formed with a cutting edge, and a cutter mounted on and held in the barrel to move in the arc of a circle toward its forward end, and means for controlling the cutter.

2. An eye-extractor for fruits and vegetables, comprising a barrel open at its forward end and formed slanting and with an advance cutting edge, and a cutter pivoted to the barrel adapted to move across the open end of the barrel, and a spring arranged to act upon said cutter for holding the cutter distant from the open end of the barrel.

3. An eye-extractor for fruits and vegetables, comprising a barrel open at its forward end and formed slanting and with an advance cutting edge, and a hollow cutter mounted on the barrel to have motion in the latter toward and across its open end, and means for actuating the cutter.

4. A device of the kind described, comprising a barrel having a cutting edge at one end, and a cutter in the barrel and adapted to move toward and across the open end of the barrel, said cutter being held by a lever joined pivotally to the barrel, and a spring disposed to normally hold the cutter away from said open end.

5. An eye-extractor for fruits and vegetables, comprising a barrel open at its forward end and formed with a cutting edge, and a cutter held in the barrel to move toward and across its open end, and an ejector held by the barrel to act at the front end of the barrel.

6. A device of the kind described, comprising a hollow metal barrel open at one end, and having a cutting edge, a perforated lever held pivotally to the barrel partly without and partly within the latter, and a cutter at the inner end of the lever, and an ejecting-spring longitudinally disposed under the barrel and passing through the lever.

7. A device of the kind described, comprising a barrel having a cutting edge at one end, and a cutter in the barrel held by a lever joined pivotally to the barrel, to move endwise in the barrel, and a longitudinally-disposed spring held by the barrel with its forward end resting on the inner surface of the barrel near said cutting edge.

8. A device of the kind described, consisting of a hollow, metal barrel open at one end and having a cutting edge thereat, and a cutter pivoted to the barrel and held to move pivotally therein, means for moving the cutter on its pivot, the edge of said cutter being adapted to meet the inner concave surface of the barrel and curved to have a continuous line of contact with said surface of the barrel.

In witness whereof I have hereunto set my hand, this 23d day of December, 1903, in the presence of two subscribing witnesses.

ROBERT PATTERSON.

Witnesses:
ENOS B. WHITMORE,
MINNIE SMITH.